(12) United States Patent
Nakamura et al.

(10) Patent No.: US 12,248,758 B2
(45) Date of Patent: Mar. 11, 2025

(54) GENERATION DEVICE AND NORMALIZATION MODEL

(71) Applicant: NTT DOCOMO, INC., Chiyoda-ku (JP)

(72) Inventors: Toshimitsu Nakamura, Chiyoda-ku (JP); Noritaka Okamoto, Chiyoda-ku (JP); Wataru Uchida, Chiyoda-ku (JP); Yoshinori Isoda, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 509 days.

(21) Appl. No.: 17/619,282

(22) PCT Filed: Apr. 17, 2020

(86) PCT No.: PCT/JP2020/016914
§ 371 (c)(1),
(2) Date: Dec. 15, 2021

(87) PCT Pub. No.: WO2020/255553
PCT Pub. Date: Dec. 24, 2020

(65) Prior Publication Data
US 2022/0245363 A1 Aug. 4, 2022

(30) Foreign Application Priority Data

Jun. 17, 2019 (JP) .................. 2019-111803

(51) Int. Cl.
*G06F 40/47* (2020.01)
*G06F 40/279* (2020.01)
*G06F 40/51* (2020.01)

(52) U.S. Cl.
CPC ............ *G06F 40/47* (2020.01); *G06F 40/279* (2020.01); *G06F 40/51* (2020.01)

(58) Field of Classification Search
None
See application file for complete search history.

(56) References Cited

U.S. PATENT DOCUMENTS

2013/0262077 A1* 10/2013 Fuji ...................... G06F 40/40
704/2
2014/0303960 A1* 10/2014 Orsini ............... G06Q 30/0217
704/2

(Continued)

FOREIGN PATENT DOCUMENTS

JP    2005-108184 A    4/2005
JP    2015-82204 A     4/2015

OTHER PUBLICATIONS

International Preliminary Report on Patentability issued Dec. 30, 2021 in PCT/JP2020/016914, (submitting English translation only) 5 pages.

(Continued)

*Primary Examiner* — Antim G Shah
(74) *Attorney, Agent, or Firm* — Oblon, McClelland, Maier & Neustadt, L.L.P.

(57) ABSTRACT

A generation device is a device that generates a translated sentence in a second language from an input sentence in a first language to be translated. The generation device includes: an acquisition unit that acquires the input sentence; a normalization unit that converts the input sentence into a normalized sentence that is a grammatically correct sentence in the first language; and a first translation unit that generates the translated sentence by translating the normalized sentence into the second language using first parallel translation data that is parallel translation data between the first language and the second language. The normalization unit generates the normalized sentence by using second parallel translation data that is parallel translation data between a third language and the first language. A data amount of the (Continued)

second parallel translation data is larger than a data amount of the first parallel translation data.

6 Claims, 14 Drawing Sheets

(56) References Cited

U.S. PATENT DOCUMENTS

2018/0052829 A1* 2/2018 Lee .................. G06F 40/42
2019/0236147 A1* 8/2019 Lee .................. G06F 40/47

OTHER PUBLICATIONS

International Search Report mailed on Jun. 16, 2020 in PCT/JP2020/016914 filed on Apr. 17, 2020, 3 pages).
Mizumoto et al., "A Study on the Use of Multiple Methods in English Writing Error Correction", IPSJ SIG Technical Reports [CD-ROM], Oct. 15, 2012, vol. 2012-NL-208, No. 8, pp. 1-7, 11 total pages (with partial English translation).
Japanese Office Action issued Oct. 3, 2023 in Japanese Application 2021-527408, (with unedited computer-generated English translation), 6 pages.

* cited by examiner

Fig. 8

| WORD | ...... | イカ | 生産 | の | 計画 | が | あり | ...... |
|---|---|---|---|---|---|---|---|---|
| LIKELIHOOD | ...... | 0.2 | 0.8 | 0.8 | 0.8 | 0.8 | 0.8 | ...... |
| | | W1 | W2 | W3 | W4 | W5 | W6 | |

E1 spans W1–W2; Sn4 spans the full row.

Fig. 12

| WORD | ...... | habor | have | a | plan | for | roaming | ...... |
|---|---|---|---|---|---|---|---|---|
| LIKELIHOOD | ...... | 0.2 | 0.8 | 0.8 | 0.8 | 0.8 | 0.8 | ...... |
| | | W11 | W12 | W13 | W14 | W15 | W16 | |

E11 = {W11}

Sn14 = {W12, W13, W14, W15, W16, ...}

GENERATION DEVICE AND NORMALIZATION MODEL

TECHNICAL FIELD

The present disclosure relates to a generation device and a normalization model.

BACKGROUND ART

There is known a machine translation device that translates sentences in a first language into sentences in a second language. For example, Patent Literature 1 discloses a machine translation device that translates a sentence in a first language into a sentence in a second language to recognize an unknown word in the first language that is not registered in a parallel translation dictionary between the first language and the second language from the translation result, and translates the sentence in the first language into a sentence in the second language after replacing the unknown word with an alternative notation in the sentence in the first language. This machine translation device translates a sentence in the first language into a sentence in a third language, and then generates the alternative notation of the unknown word by back-translating a part of the translated sentence corresponding to the unknown word into the first language.

CITATION LIST

Patent Literature

Patent Literature 1: Japanese Unexamined Patent Publication No. 2015-82204

SUMMARY OF INVENTION

Technical Problem

Incidentally, the result of voice recognition of the voice generated by the user may be used as a translation target. In this case, the translation target may include a noise such as a filler, a rephrase, and a pause. When a sentence input by a user using an input device such as a keyboard is used as a translation target, the translation target may include a noise such as an input error. In the machine translation device described in Patent Literature 1, when a sentence including a noise as described above is used as a translation target, the noise can be recognized as an unknown word. However, when a word of a third language corresponding to the noise exists, the sentence is translated into the second language by using an alternate notation of the first language corresponding to the third language. As a result, an accurate translation may not be obtained.

The present disclosure describes a generation device and a normalization model capable of improving translation accuracy.

Solution to Problem

A generation device according to an aspect of the present disclosure is a device that generates a translated sentence in a second language different from a first language from an input sentence in the first language to be translated. The generation device includes: an acquisition unit that acquires the input sentence; a normalization unit that converts the input sentence into a normalized sentence that is a grammatically correct sentence in the first language; and a first translation unit that generates the translated sentence by translating the normalized sentence into the second language using first parallel translation data that is parallel translation data between the first language and the second language. The normalization unit generates the normalized sentence by using second parallel translation data that is parallel translation data between a third language different from the first language and the second language and the first language. A data amount of the second parallel translation data is larger than a data amount of the first parallel translation data.

In the generation device, an input sentence in the first language is converted into a normalized sentence by using the second parallel translation data between the first language and the third language. Since the normalized sentence is a grammatically correct sentence in the first language, by converting the input sentence into a normalized sentence, noises such as fillers, rephrases, pauses, and input errors can be eliminated. Since the normalized sentence from which the noises are removed is translated into the second language to generate a translated sentence, the influence of the noise on the translated sentence can be reduced. As a result, the translation accuracy can be improved.

Advantageous Effects of Invention

According to the present disclosure, translation accuracy can be improved.

BRIEF DESCRIPTION OF DRAWINGS

FIG. 8 is a diagram for describing an error expression detection process.

FIG. 12 is a diagram for describing an error expression detection process.

DESCRIPTION OF EMBODIMENTS

In the following, some embodiments of the present disclosure will be described with reference to the drawings. It should be noted that in the description of the drawings, the same components are designated with the same reference signs, and the redundant description is omitted.

Figure 1:
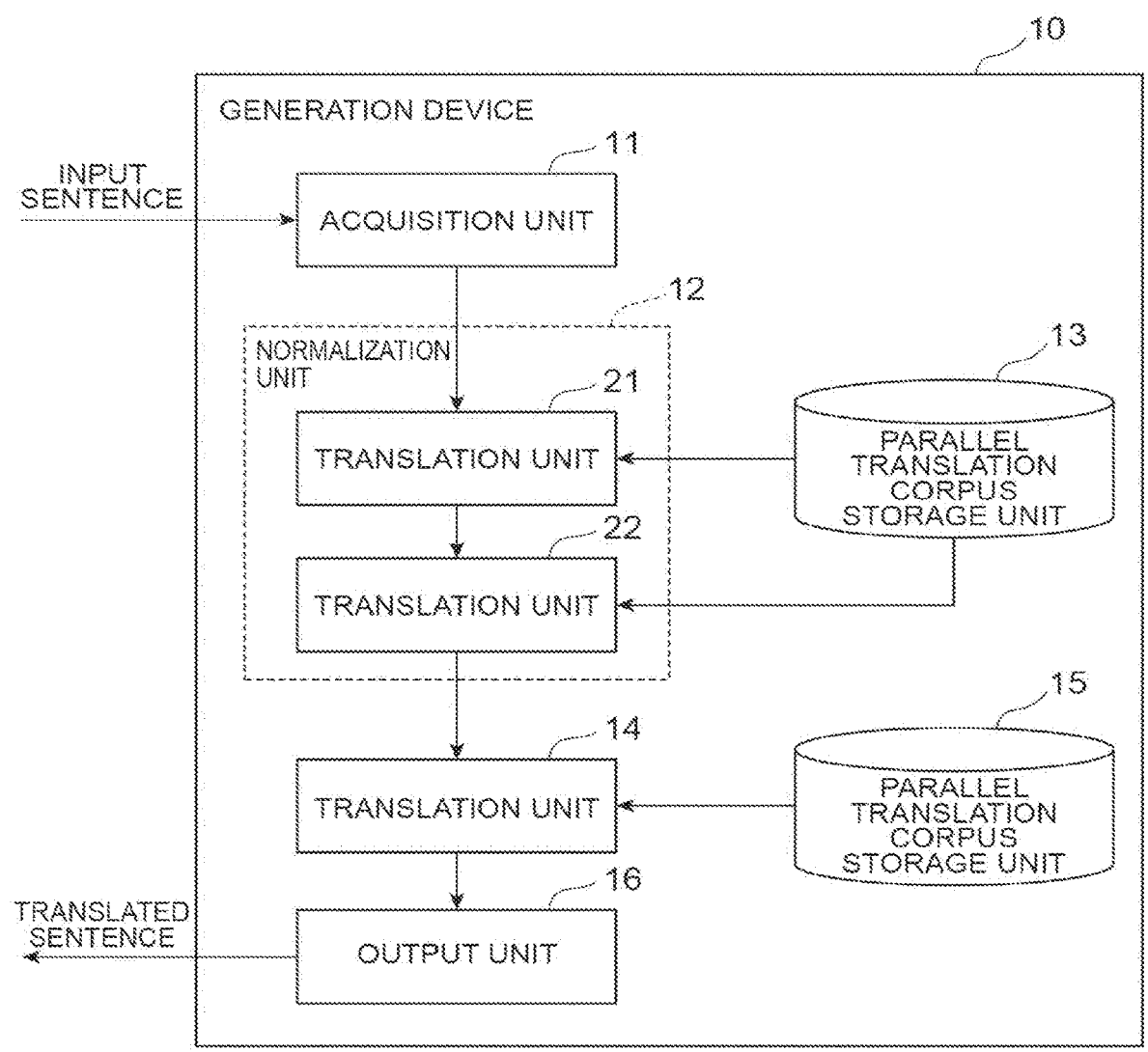
FIG. 1 is a functional block diagram of a generation device according to an embodiment.

A configuration of a generation device 10 according to an embodiment will be described with reference to FIG. 1. FIG. 1 is a functional block diagram of a generation device according to an embodiment. The generation device 10 shown in FIG. 1 is a device for generating a translated sentence in a second language from an input sentence in a first language to be translated. The generation device 10 generates the translated sentence using a parallel translation corpus (bilingual corpus) (hereinafter referred to as "first parallel translation corpus") between the first language and the second language and a parallel translation corpus (hereinafter referred to as "second parallel translation corpus") between the first language and a third language. A parallel translation corpus is a corpus (database of sentences) of parallel translation data (bilingual data) in which two sentences in different languages are arranged in a parallel translation form, which is constructed for use as learning data of machine translation. That is, the first parallel translation corpus includes a plurality of parallel translation data (first parallel translation data), and each parallel translation data is a combination of a sentence in the first language and a sentence in the second language associated with each other. Similarly, the second parallel translation corpus includes a plurality of parallel translation data (second parallel translation data), and each parallel translation data is a combination of a sentence in the first language and a sentence in the third language associated with each other.

The first language is, for example, Japanese. The second language is a language different from the first language, for example, Chinese. The third language is a language different from the first language and the second language, for example, English. The amount of parallel translation data included in the second parallel translation corpus is larger than the amount of parallel translation data included in the first parallel translation corpus. As long as the languages have such a relationship, the first language, the second language, and the third language may be any other language or different dialects of the same language. The language is not limited to natural language, but may be an artificial language, a formal language (computer programming language), or the like.

A sentence is a unit of linguistic expression that is governed by a single statement, complete in form. A sentence may be replaced with one or more sentences (e.g., paragraph or text). A word is the smallest unit of a language having grammatical meanings and functions, and is a component of a sentence. A word may be replaced with one or more words (e.g., phrase or expression).

The generation device 10 functionally includes an acquisition unit 11, a normalization unit 12, a parallel translation corpus storage unit 13, a translation unit 14 (first translation unit), a parallel translation corpus storage unit 15, and an output unit 16.

The acquisition unit 11 acquires an input sentence in the first language to be translated. The input sentence may be, for example, a sentence obtained by converting the result of voice recognition of voices issued by a user into a text. When a voice recognition result or the like is used as an input sentence, the input sentence may include a noise such as a filler, a rephrase, and a pause. The input sentence may be a sentence input by a user using an input device such as a keyboard. In such a case, the input sentence may include a noise such as an input error. The acquisition unit 11 outputs the input sentence to the normalization unit 12.

The parallel translation corpus storage unit 13 stores the second parallel translation corpus. The second parallel translation corpus is prepared in advance and stored in the parallel translation corpus storage unit 13.

The normalization unit 12 receives an input sentence from the acquisition unit 11 and converts the input sentence into a normalized sentence in the first language. The normalized sentence is a grammatically correct sentence in the first language. The grammatically correct sentence is a sentence that does not include the above-mentioned noise, and does not necessarily mean that it has all the configuration elements of a sentence such as a subject and a predicate. The normalization unit 12 generates the normalized sentence by using the second parallel translation corpus. Specifically, the normalization unit 12 uses the second parallel translation corpus stored in the parallel translation corpus storage unit 13 to generate a translated sentence in the third language (hereinafter referred to as "translated sentence for normalization") by translating the input sentence into the third language and to generate the normalized sentence by translating the translated sentence for normalization into the first language. The normalization unit 12 includes a translation unit 21 (second translation unit) and a translation unit 22 (third translation unit).

The translation unit 21 generates the translated sentence for normalization by translating the input sentence into the third language using the second parallel translation data stored in the parallel translation corpus storage unit 13. The translation unit 21 may be a machine translation model for causing a computer to function so as to receive the input sentence as an input and output the translated sentence for normalization. Examples of the machine translation model include a neural machine translation (NMT) model. In this case, the translation unit 21 is generated by executing machine learning using each of the plurality of parallel translation data included in the second parallel translation corpus as learning data. The translation unit 21 outputs the translated sentence for normalization to the translation unit 22.

The translation unit 22 generates the normalized sentence by translating the translated sentence for normalization into the first language using the second parallel translation data stored in the parallel translation corpus storage unit 13. The translation unit 22 may be a machine translation model (for example, NMT) for causing a computer to function so as to receive the translated sentence for normalization as an input and output the normalized sentence. In this case, the translation unit 22 is generated by executing machine learning using each of the plurality of parallel translation data included in the second parallel translation corpus as learning data. The translation unit 22 outputs the normalized sentence to the translation unit 14.

The parallel translation corpus storage unit 15 stores the first parallel translation corpus. The first parallel translation corpus is prepared in advance and stored in the parallel translation corpus storage unit 15.

The translation unit 14 receives the normalized sentence from the normalization unit 12 (translation unit 22) and generates the translated sentence by translating the normalized sentence into the second language. The translation unit 14 may be a machine translation model (for example, NMT) for causing a computer to function so as to receive the normalized sentence as an input and output the translated sentence. In this case, the translation unit 14 is generated by executing machine learning using each of the plurality of parallel translation data included in the first parallel translation corpus stored in the parallel translation corpus storage unit 15 as learning data. The translation unit 14 outputs the translated sentence to the output unit 16.

The output unit 16 outputs the translated sentence. For example, upon receiving the translated sentence from the translation unit 14, the output unit 16 outputs the translated sentence to the outside of the generation device 10. The output unit 16 may output the translated sentence to an output device such as a display or a speaker, for example. The output unit 16 may output a combination of the input sentence and the translated sentence as parallel translation data.

Figure 2:
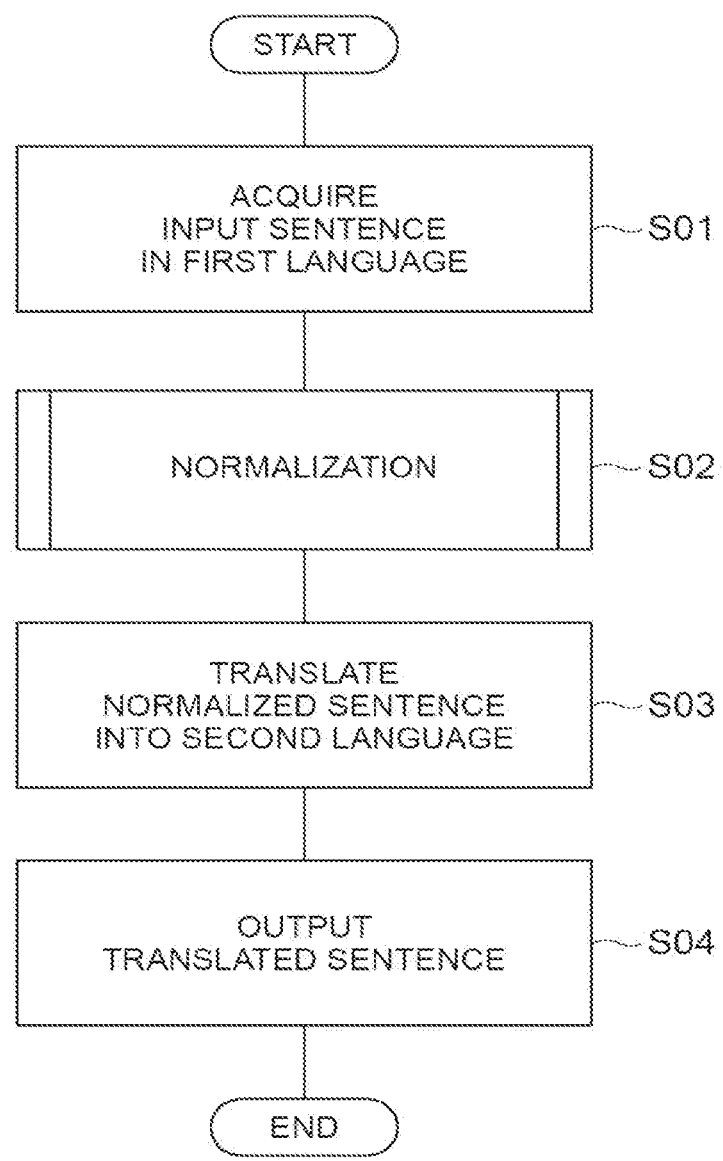
FIG. 2 is a flowchart showing a series of processes of a generation method performed by the generation device shown in FIG. 1.
Figure 3:
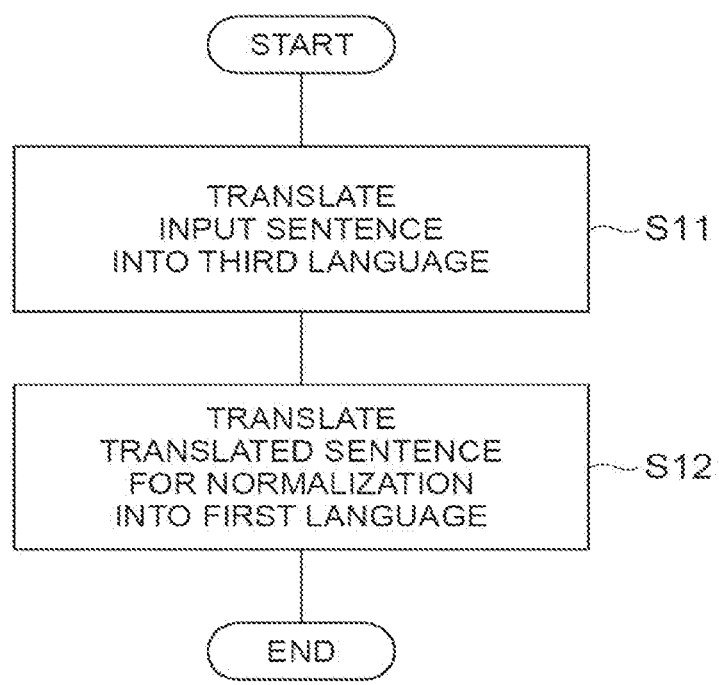
FIG. 3 is a flowchart showing in detail a normalization process of FIG. 2.
Figure 4:
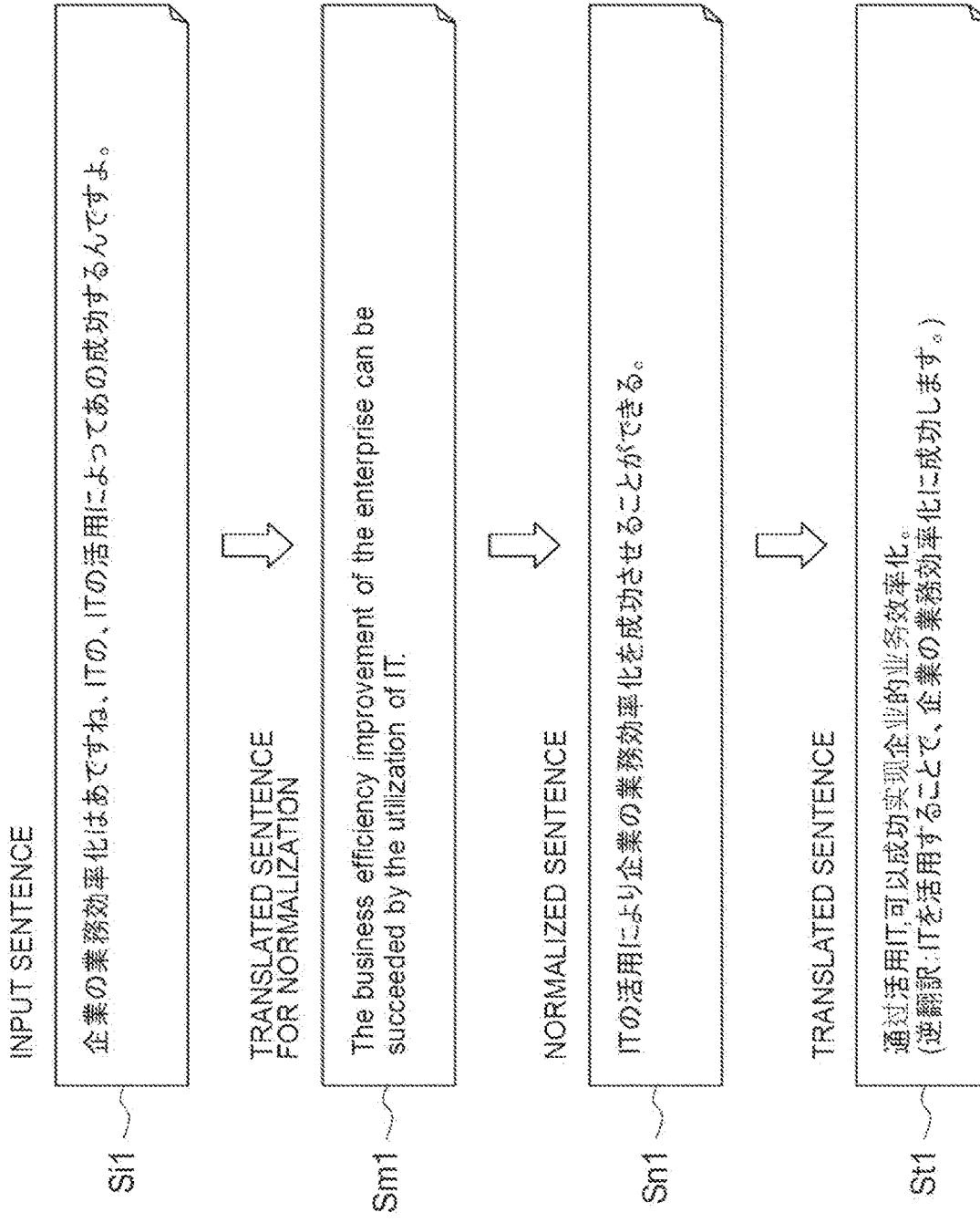
FIG. 4 is a diagram showing an example of a translation result by the generation device shown in FIG. 1.

Next, a generation method performed by the generation device 10 will be described with reference to FIGS. 2 to 4. FIG. 2 is a flowchart showing a series of processes of a generation method performed by the generation device shown in FIG. 1. FIG. 3 is a flowchart showing a normalization process of FIG. 2 in detail. FIG. 4 is a diagram showing an example of a translation result by the generation device shown in FIG. 1. The series of processes shown in FIG. 2 is started, for example, by a user speaking. In the example shown in FIG. 4, Japanese is used as the first language, Chinese is used as the second language, and English is used as the third language.

As shown in FIG. 2, first, the acquisition unit 11 acquires an input sentence in the first language (here, Japanese) (step S01). In the example shown in FIG. 4, the acquisition unit 11 acquires a Japanese input sentence Si1. The input sentence Si1 is a sentence obtained by voice recognition of a user's speech, and includes noises such as a filler, a rephrase, and a pause. Then, the acquisition unit 11 outputs the input sentence to the normalization unit 12.

Subsequently, upon receiving the input sentence from the acquisition unit 11, the normalization unit 12 normalizes the input sentence (step S02). In step S02, as shown in FIG. 3, first, the translation unit 21 translates the input sentence into the third language (here, English) to generate a translated sentence for normalization (step S11). In the example shown in FIG. 4, an English translated sentence Sm1 for normalization is generated. The translated sentence Sm1 for normalization has the same meaning as the input sentence Si1, but does not include the noise included in the input sentence Si1. Then, the translation unit 21 outputs the translated sentence for normalization to the translation unit 22.

Subsequently, upon receiving the translated sentence for normalization from the translation unit 21, the translation unit 22 translates the translated sentence for normalization into the first language to generate the normalized sentence (step S12). In the example shown in FIG. 4, a Japanese normalized sentence Sn1 is generated. The normalized sentence Sn1 is a sentence obtained by removing the noise from the input sentence Si1, and has the same meaning as the input sentence Si1. The translation unit 22 then outputs the normalized sentence to the translation unit 14.

Subsequently, upon receiving the normalized sentence from the normalization unit 12, the translation unit 14 generates the translated sentence by translating the normalized sentence into the second language (here, Chinese language) (step S03). For example, in the example shown in FIG. 4, a Chinese translated sentence St1 is generated. The meaning of the translated sentence St1 is "The business efficiency improvement of the enterprise can be succeeding by utilizing IT.". The translation unit 14 then outputs the translated sentence to the output unit 16.

Subsequently, upon receiving the translated sentence from the translation unit 14, the output unit 16 outputs the translated sentence (step S04). For example, the output unit 16 outputs the translated sentence to the outside of the generation device 10. The output unit 16 may output the translated sentence to an output device such as a display or a speaker, for example.

Thus, the series of processes of the generation method is ended.

Figure 5:
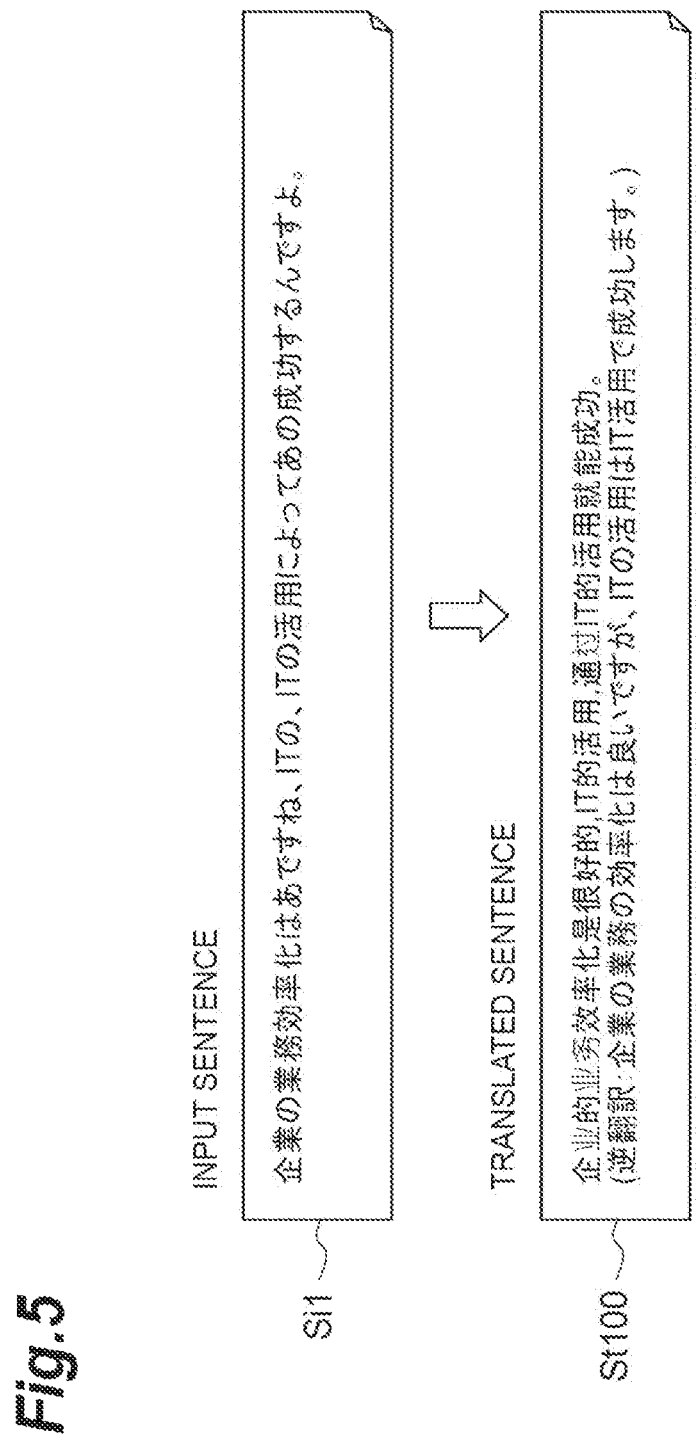
FIG. 5 is a diagram showing a translation result according to a comparative example.

The operation and effect of the generation device 10 will be described with reference further to FIG. 5. FIG. 5 is a diagram showing a translation result according to a comparative example. When the input sentence Si1 is directly translated into Chinese as an input sentence including noises such as a filler, a rephrase, and a pause, a translated sentence St100 shown in FIG. 5 is generated. The meaning of the translated sentence St100 is "The business efficiency improvement of the enterprise is good, but IT utilization is successful by the utilization of IT.". As in this example, since the data amount of the first parallel translation corpus is smaller than the data amount of the second parallel translation corpus, if a noise is included in the input sentence, the translation accuracy decreases.

On the other hand, in the generation device 10, an input sentence in the first language is converted into a normalized sentence by using the second parallel translation corpus between the first language and the third language. Since the normalized sentence is a grammatically correct sentence in the first language, noises such as fillers, rephrases, pauses, and input errors can be eliminated by converting the input sentence into the normalized sentence. Since a translated sentence is generated by translating the normalized sentence including no noise into the second language, the influence of noise on the translated sentence can be reduced. As a result, the translation accuracy can be improved.

Specifically, the translation unit 21 generates a translated sentence for normalization by translating the input sentence into the third language using the second parallel translation data. The translation unit 22 generates the normalized sentence by translating the translated sentence for normalization into the first language using the second parallel translation data. According to this configuration, when the data amount of the second parallel translation corpus is sufficiently large, the translated sentence for normalization with no noise and the normalized sentence with no noise can be obtained even if some noises are included in the input sentence. For example, as shown in FIG. 4, the translated sentence Sm1 for normalization and the normalized sentence Sn1 include no noise. Since the translated sentence is generated by translating the normalized sentence including no noise into the second language, the influence of noise on the translated sentence can be reduced.

The translation unit 21 and the translation unit 22 are machine translation models for performing machine learning using the second parallel translation corpus. According to the configurations, the accuracy of the normalized sentence can be improved by learning the translation unit 21 and the translation unit 22 using a sufficient amount of the second parallel translation corpus.

Figure 6:
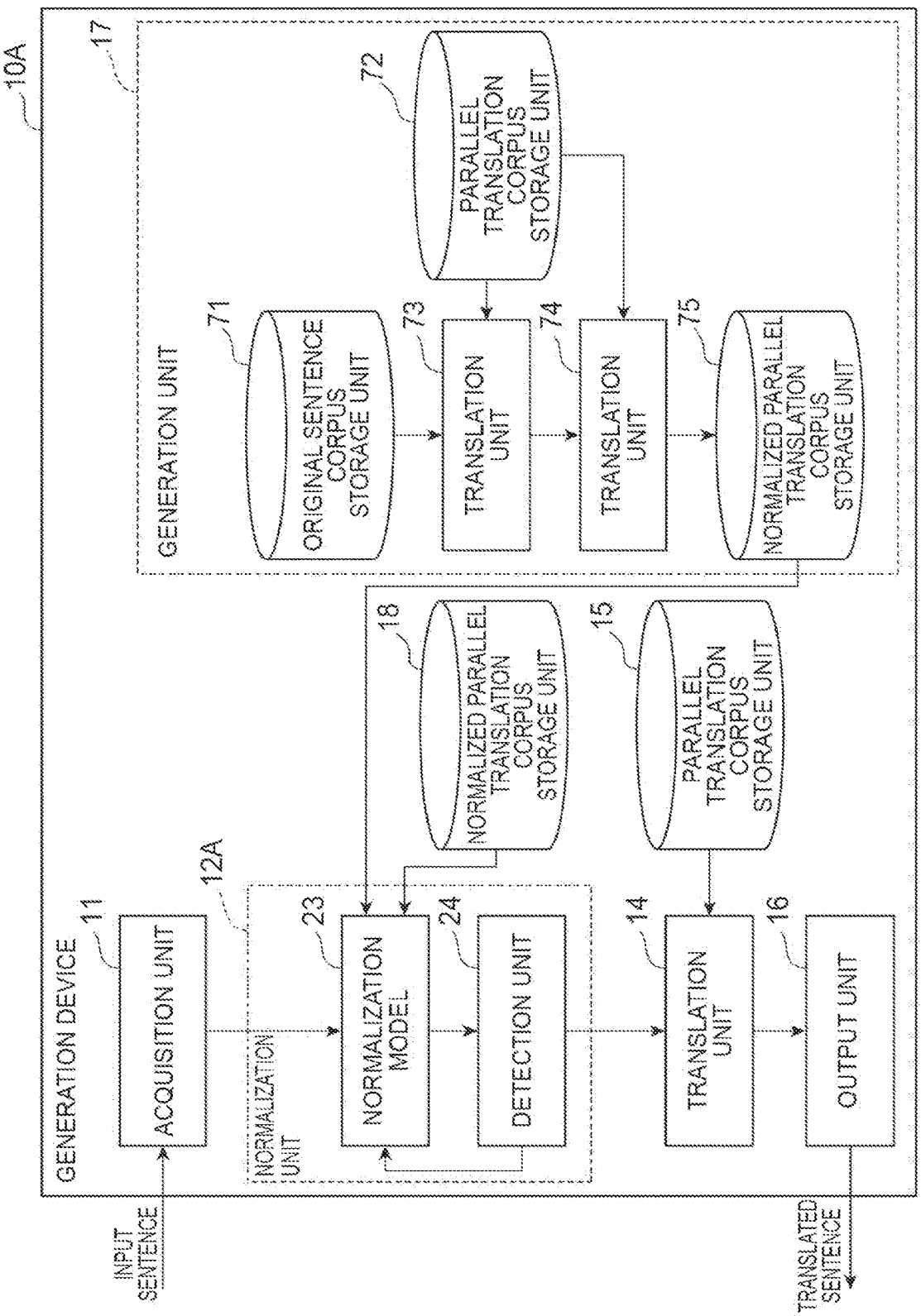
FIG. 6 is a functional block diagram of a generation device according to another embodiment.
Figure 7:
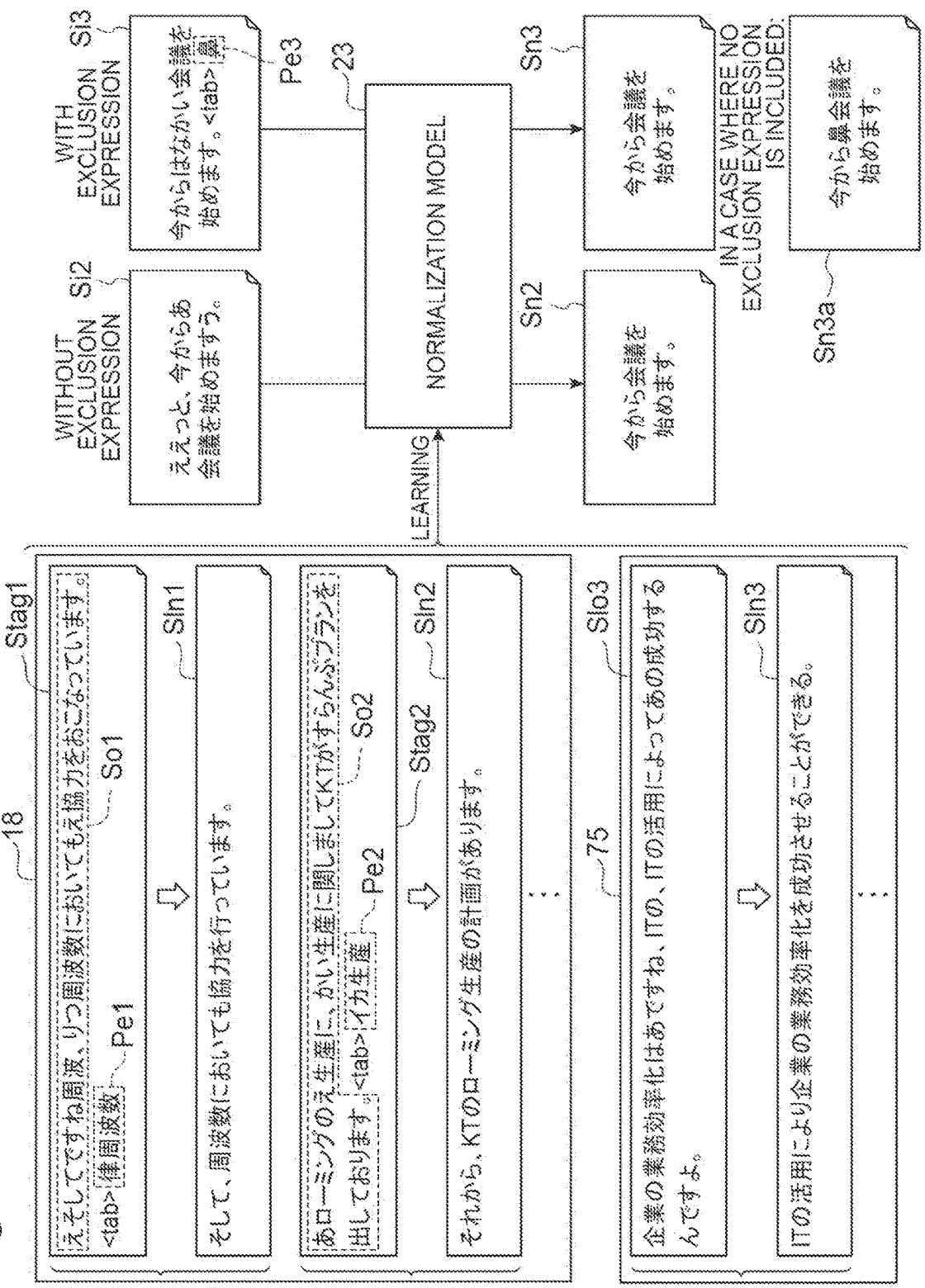
FIG. 7 is a diagram for describing learning data.

A configuration of a generation device 10A according to another embodiment will be described with reference to FIGS. 6 to 8. FIG. 6 is a functional block diagram of a generation device according to another embodiment. FIG. 7 is a diagram for describing learning data. FIG. 8 is a diagram for describing an error expression detection process. The generation device 10A shown in FIG. 6 is mainly different from the generation device 10 in that the generation device 10A includes a normalization unit 12A in place of the normalization unit 12, and that the generation device 10A further includes a generation unit 17 and a normalized parallel translation corpus storage unit 18. In the examples shown in FIGS. 7, 8, and 10, an input sentence in Japanese is used as an input sentence in the first language to be translated. As described above, the input sentence is not limited to an input sentence in Japanese, but may be an input sentence in another language such as English or Chinese.

The generation unit 17 generates learning data for learning a normalization model 23 described later. The generation unit 17 includes an original sentence corpus storage unit 71, a parallel translation corpus storage unit 72, a translation unit 73 (second translation unit), a translation unit 74 (third translation unit), and a normalized parallel translation corpus storage unit 75.

The original sentence corpus storage unit 71 stores an original sentence corpus. The original sentence corpus is a database composed of a plurality of original sentences for learning which are sentences in the first language. The original sentence for learning is a sentence before normalization and may include a noise such as a filler, a rephrase, a pause, and an input error. The original sentence for learning is obtained, for example, by converting a natural human speech into a text with voice recognition. The plurality of original sentences for learning are prepared in advance and stored in the original sentence corpus storage unit 71. The input sentence acquired by the acquisition unit 11 may be added to the original sentence corpus as an original sentence for learning.

The parallel translation corpus storage unit 72 has the same function as the parallel translation corpus storage unit 13, and stores the second parallel translation corpus. The second parallel translation corpus is prepared in advance and stored in the parallel translation corpus storage unit 72.

The translation unit 73 has the similar function to the translation unit 21, and generates a translated sentence for learning in the third language by translating the original sentence for learning into the third language using second parallel translation data stored in the parallel translation corpus storage unit 72. The translation unit 73 may be a machine translation model (for example, NMT) for causing a computer to function so as to receive the original sentence for learning as an input and output the translated sentence for learning. In this case, the translation unit 73 is generated by executing machine learning using each of a plurality of parallel translation data included in the second parallel translation corpus as learning data. The translation unit 73 outputs the translated sentence for learning together with the original sentence for learning to the translation unit 74.

The translation unit 74 has the similar function to the translation unit 22, and generates a normalized sentence for learning in the first language by translating the translated sentence for learning into the first language using the second parallel translation data stored in the parallel translation corpus storage unit 72. The normalized sentence for learning is a grammatically correct sentence of the first language and is obtained by normalizing the original sentence for learning. In other words, the normalized sentence for learning is obtained by removing noises from the original sentence for learning. The translation unit 74 may be a machine translation model (for example, NMT) for causing a computer to function so as to receive the translated sentence for learning as an input and output the normalized sentence for learning. In this case, the translation unit 74 is generated by executing machine learning using each of the plurality of parallel translation data included in the second parallel translation corpus as learning data. The translation unit 74 outputs a combination of the normalized sentence for learning and the original sentence for learning to the normalized parallel translation corpus storage unit 75.

The normalized parallel translation corpus storage unit 75 stores a normalized parallel translation corpus. The normalized parallel translation corpus is a database composed of a plurality of normalized parallel translation data. Each normalized parallel translation data is a combination of an original sentence for learning and a normalized sentence for learning associated with each other. Upon receiving a combination of an original sentence for learning and a normalized sentence for learning obtained by normalizing the original sentence for learning from the translation unit 74, the normalized parallel translation corpus storage unit 75 adds the combination to the normalized parallel translation corpus as normalized parallel translation data. In the example shown in FIG. 7, a normalized parallel translation data in which a Japanese original sentence Slo3 for learning and a Japanese normalized sentence Sln3 for learning are associated is shown. The original sentence Slo3 for learning includes some noises. The normalized sentence Sln3 for learning is a sentence obtained by removing the noises from the original sentence Slo3 for learning. The meaning of the normalized sentence Sln3 for learning is "The business efficiency improvement of the enterprise can be succeeding by utilizing IT.".

The normalized parallel translation corpus storage unit 18 stores another normalized parallel translation corpus. Another normalized parallel translation corpus is a database composed of a plurality of normalized parallel translation data. Each normalized parallel translation data is a combination of a tagged original sentence for learning and a normalized sentence for learning. The tagged original sentence for learning, like the original sentence for learning, is a sentence before normalization and may include a noise such as a filler, a rephrase, a pause, and an input error. The tagged original sentence for learning further includes a designation of an exclusion expression. Symbols for distinguishing the exclusion expression from the original sentence are used to designate the exclusion expression. For example, the string following <tab> is designated as an exclusion expression. In other words, the tagged original sentence for learning has a structure of "(original sentence) <tab> (exclusion expression)".

In the example shown in FIG. 7, a Japanese tagged original sentence Stag1 for learning is shown. The tagged original sentence Stag1 for learning includes an original sentence So1 including some noises and an exclusion expression Pe1. Similarly, a Japanese tagged original sentence Stag2 for learning includes an original sentence So2 including some noises and an exclusion expression Pe2.

The normalized sentence for learning is a grammatically correct sentence in the first language not including the exclusion expression designated in the tagged original sentence for learning, and is obtained by normalizing the tagged original sentence for learning. In other words, the normalized sentence for learning is generated such that noises are removed from the tagged original sentence for learning and the exclusion expression is not included. As shown in FIG. 7, a Japanese normalized sentence Sln1 for learning associated with the tagged original sentence Stag1 for learning does not include the exclusion expression Pe1. The meaning of the normalized sentence Sln1 for learning is "and we are also cooperating on frequency.". Similarly, a Japanese normalized sentence Sln2 for learning associated with the tagged original sentence Stag2 for learning does not include the exclusion expression Pe2. The meaning of the normalized sentence Sln2 for learning is "Then, we have a plan for the roaming production of KT.".

Like the normalization unit 12, the normalization unit 12A receives an input sentence from the acquisition unit 11 and converts the input sentence into a normalized sentence. The normalization unit 12A includes a normalization model 23 and a detection unit 24.

The normalization model 23 is a machine translation model (for example, NMT) for causing a computer to function so as to receive the input sentence as an input and output the normalized sentence. The normalization model 23 is generated by executing machine learning using the learning data generated using the second parallel translation corpus. Specifically, as shown in FIG. 7, the normalization model 23 is generated by executing machine learning using, as learning data, each of the plurality of normalized parallel translation corpus data included in the normalized parallel translation corpus stored in the normalized parallel translation corpus storage unit 75 and the plurality of normalized parallel translation data included in another normalized parallel translation corpus stored in the normalized parallel translation corpus storage unit 18. The normalization model 23 is generated by learning before the generation device 10A is operated. The normalization model 23 may further learn the learning data every time a new normalized parallel translation data is added to the normalized parallel translation corpus stored in the normalized parallel translation corpus storage unit 75 or the normalized parallel translation corpus storage unit 18, or may learn the learning data every time a predetermined time elapses.

The normalization model 23 receives the input sentence as an input from the acquisition unit 11 or the detection unit 24, and outputs the normalized sentence. The normalization model 23 generates candidate words that can constitute the normalized sentence and a likelihood of each candidate word for the input sentence. The normalization model 23 sequentially selects words having the highest likelihood among the candidate words which can constitute the normalized sentence, and outputs a character string obtained by arranging the selected words as the normalized sentence. Since the exclusion expression is designated in the input sentence received from the detection unit 24, the normalization model 23 generates the normalized sentence by removing the exclusion expression from the candidate words. On the other hand, since no exclusion expression is designated in the input sentence received from the acquisition unit 11, the normalization model 23 generates the normalized sentence as usual without considering any exclusion expression. The normalization model 23 outputs the input sentence and the normalized sentence together with the likelihood of each word constituting the normalized sentence to the detection unit 24.

As shown in FIG. 7, when the normalization model 23 receives a Japanese input sentence Si2 in which any exclusion expression is not designated, the normalization model 23 outputs a Japanese normalized sentence Sn2. When the normalization model 23 receives the Japanese input sentence Si3 in which the exclusion expression Pe3 is designated, the normalization model 23 outputs a Japanese normalized sentence Sn3 in which the exclusion expression Pe3 is not included. The meanings of the normalized sentences Sn2 and Sn3 are as follows: "We will start a meeting now.". If the exclusion expression Pe3 is not designated in the input sentence Si3, the normalization model 23 may output a Japanese normalized sentence Sn3*a* including the exclusion expression Pe3. The meaning of the normalized sentence Sn3*a* is "We will start a nasal meeting now.".

The detection unit 24 receives the input sentence, normalized sentence, and the likelihood of each word from the normalization model 23, and detects an error expression included in the normalized sentence. Specifically, the detection unit 24 compares the likelihood of each word included in the normalized sentence with a preset threshold value to detect a word converted incorrectly, and detects an error expression based on the detected word. For example, the detection unit 24 detects a word having a likelihood smaller than the threshold value as a word converted incorrectly. In this embodiment, the detection unit 24 detects a phrase (e.g., a noun phrase) including the detected word as an error expression. When an error expression is detected, the detection unit 24 designates the error expression as an exclusion expression in the input sentence and outputs, as an input sentence, the input sentence in which the exclusion expression is designated to the normalization model 23. When any error expression is not detected, the detection unit 24 outputs the normalized sentence to the translation unit 14.

In the example shown in FIG. 8, the normalized sentence Sn 4 is output from the normalization model 23. The likelihood of a word W1 is 0.2, and the likelihood of each of words W2 to W6 is 0.8. The threshold value is set to, for example, 0.7 or more. The detection unit 24 compares the likelihood of each word with the threshold value, and detects the word W1 having the likelihood smaller than the threshold value. The detection unit 24 detects a noun phrase (in the example of FIG. 8, the word W1+the word W2) including the word W1 as an error expression E1. The detection unit 24 designates the error expression E as an exclusion expression in the input sentence, and outputs the input sentence in which the exclusion expression is designated to the normalization model 23.

Figure 9:
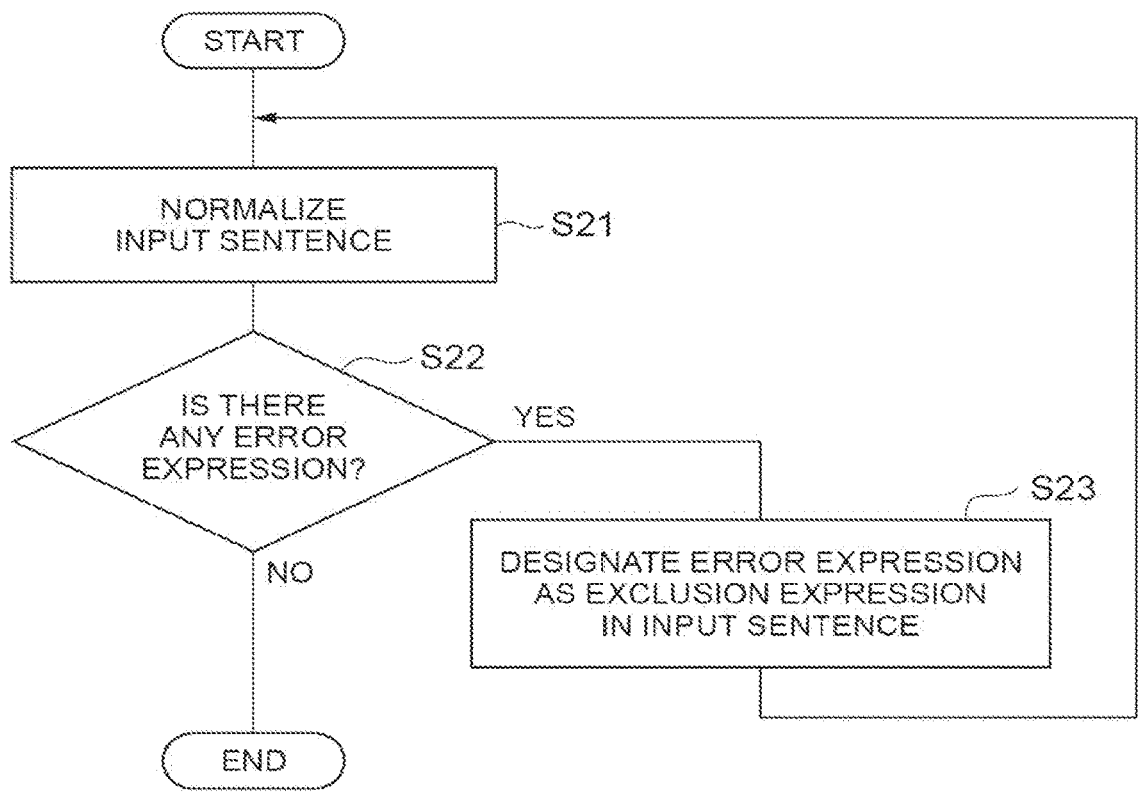
FIG. 9 is a flowchart showing in detail a normalization process of a generation method performed by the generation device shown in FIG. 6.
Figure 10:
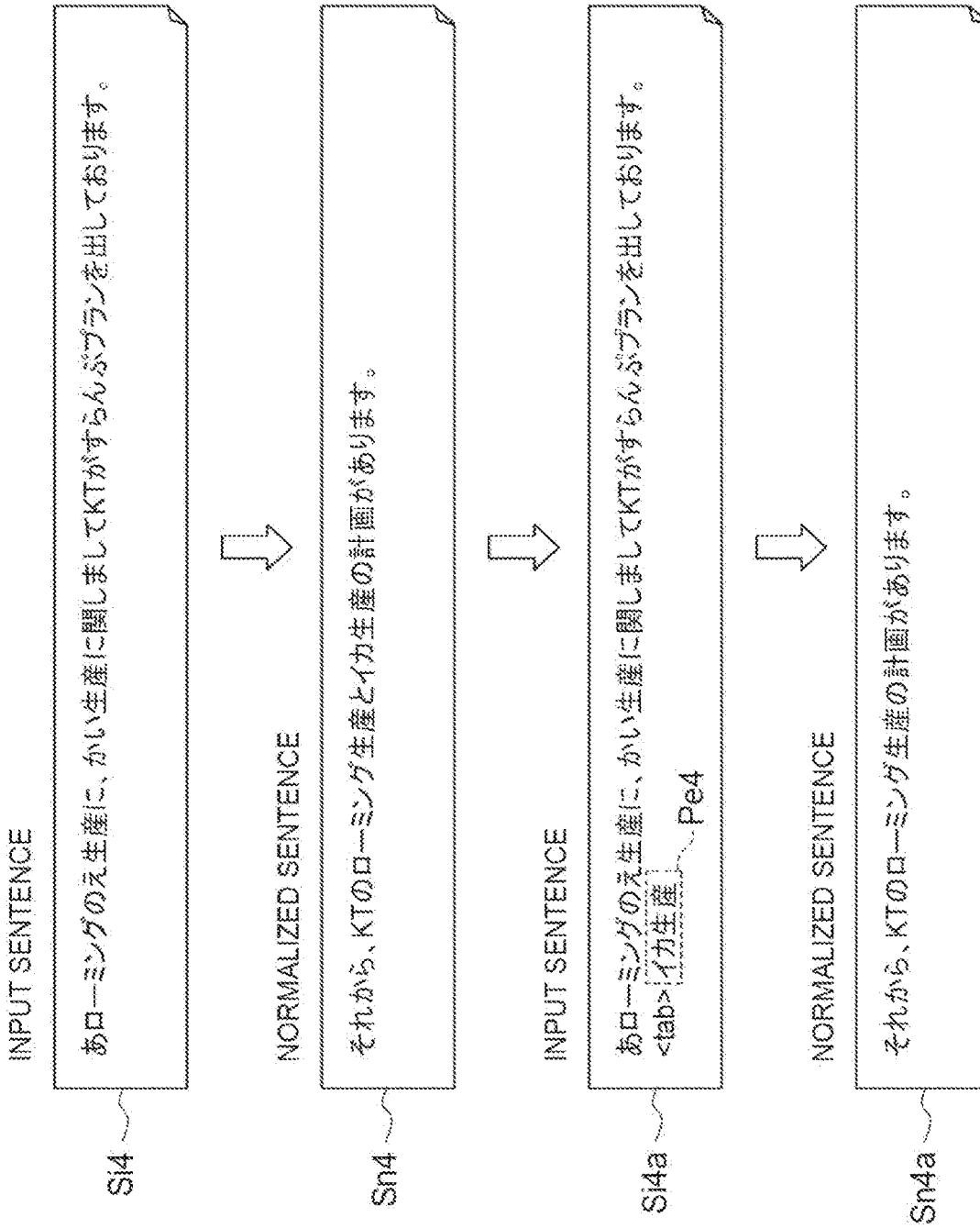
FIG. 10 is a diagram showing an example of a normalization process performed by the generation device shown in FIG. 6.

Next, a generation method performed by the generation device 10A will be described with reference to FIGS. 2 and 8 to 10. FIG. 9 is a flowchart showing in detail a normalization process of a generation method performed by the generation device shown in FIG. 6. FIG. 10 is a diagram showing an example of a normalization process performed by the generation device shown in FIG 6. Since the generation method performed by the generation device 10A is different from the generation method performed by the generation device 10 in the normalization process in step S02, the description of processes other than the normalization process is omitted.

As shown in FIG. 9, in step S02, the normalization model 23 first normalizes the input sentence (step S21). Specifically, the normalization model 23 receives the input sentence from the acquisition unit 11, and outputs the input sentence and the normalized sentence obtained by normalizing the input sentence to the detection unit 24 together with the likelihood of each word constituting the normalized sentence.

Subsequently, upon receiving the input sentence, the normalized sentence, and the likelihood of each word from the normalization model 23, the detection unit 24 determines whether or not any error expression exists in the normalized sentence (step S22). Specifically, the detection unit 24 compares the likelihood of each word included in the normalized sentence with the threshold value, and determines that an error expression exists when a likelihood smaller than the threshold value exists (step S22; YES). The detection unit 24 detects (extracts) an error expression based on a word having the likelihood smaller than the threshold value. Here, the detection unit 24 detects a phrase (e.g., a noun phrase) including the detected word as an error expression. Then, the detection unit 24 designates the error expression as an exclusion expression in the input sentence, and outputs, as an input sentence, the input sentence in which the exclusion expression is designated to the normalization model 23 (step S23).

Subsequently, upon receiving the input sentence from the detection unit 24, the normalization model 23 normalizes the input sentence (step S21). At this time, the normalization model 23 generates a normalized sentence not including the exclusion expression. The normalization model 23 then outputs the input sentence and the normalized sentence obtained by normalizing the input sentence to the detection unit 24 together with the likelihood of each word constituting the normalized sentence. Then, the determination process in step S22 is performed again.

In step S22, if the likelihood of all the words constituting the normalized sentence is equal to or greater than the threshold value, the detection unit 24 determines that no error expression exists in the normalized sentence (step S22; NO). Then, the detection unit 24 outputs the normalized sentence to the translation unit 14.

In the example shown in FIG. 10, a Japanese normalized sentence Sn4 is generated by normalizing a Japanese input sentence Si4. Since the likelihood of the word W1 among the words constituting the normalized sentence Sn4 is smaller than the threshold value (see FIG. 8), a noun phrase (word W1+word W2) including the word W1 is detected as the error expression E1. Then, by adding the error expression E1 to the input sentence Si4 as an exclusion expression Pe4, a Japanese input sentence Si4a is generated. Then, the input sentence Si4a is output to the normalization model 23. The input sentence Si4a is a sentence obtained by adding <tab> and the error expression E1 as character strings to the end of the input sentence Si4. That is, in the input sentence Si4a, the error expression E1 is designated as the exclusion expression Pe4. Then, a Japanese normalized sentence Sn4a is generated by normalizing the input sentence Si4a so as not to include the error expression E1. Since the likelihoods of all words constituting the normalized sentence Sn4a are greater than the threshold value, the normalized sentence Sn4a is output to the translation unit 14. The meaning of the normalized sentence Sn4a is "Then, we have a plan for the roaming production of KT.".

Figure 11:
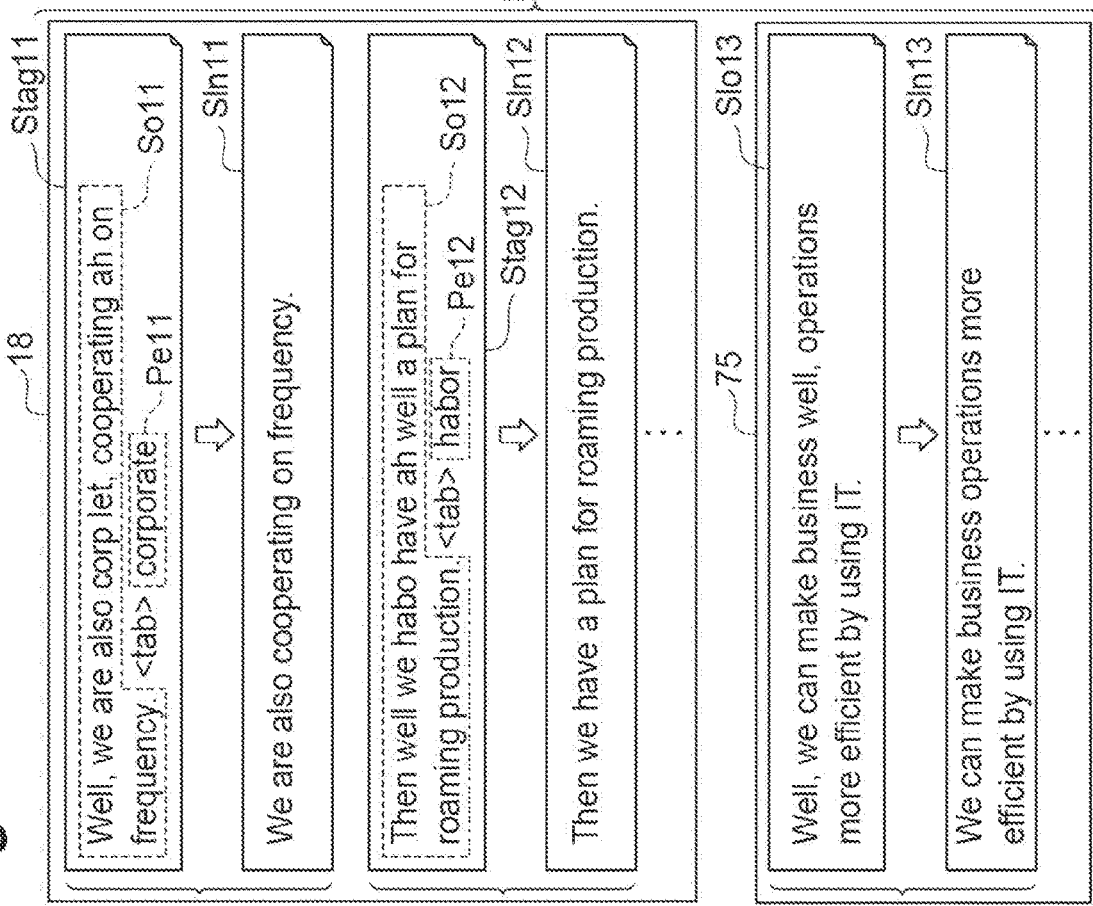
FIG. 11 is a diagram for describing learning data.
Figure 13:
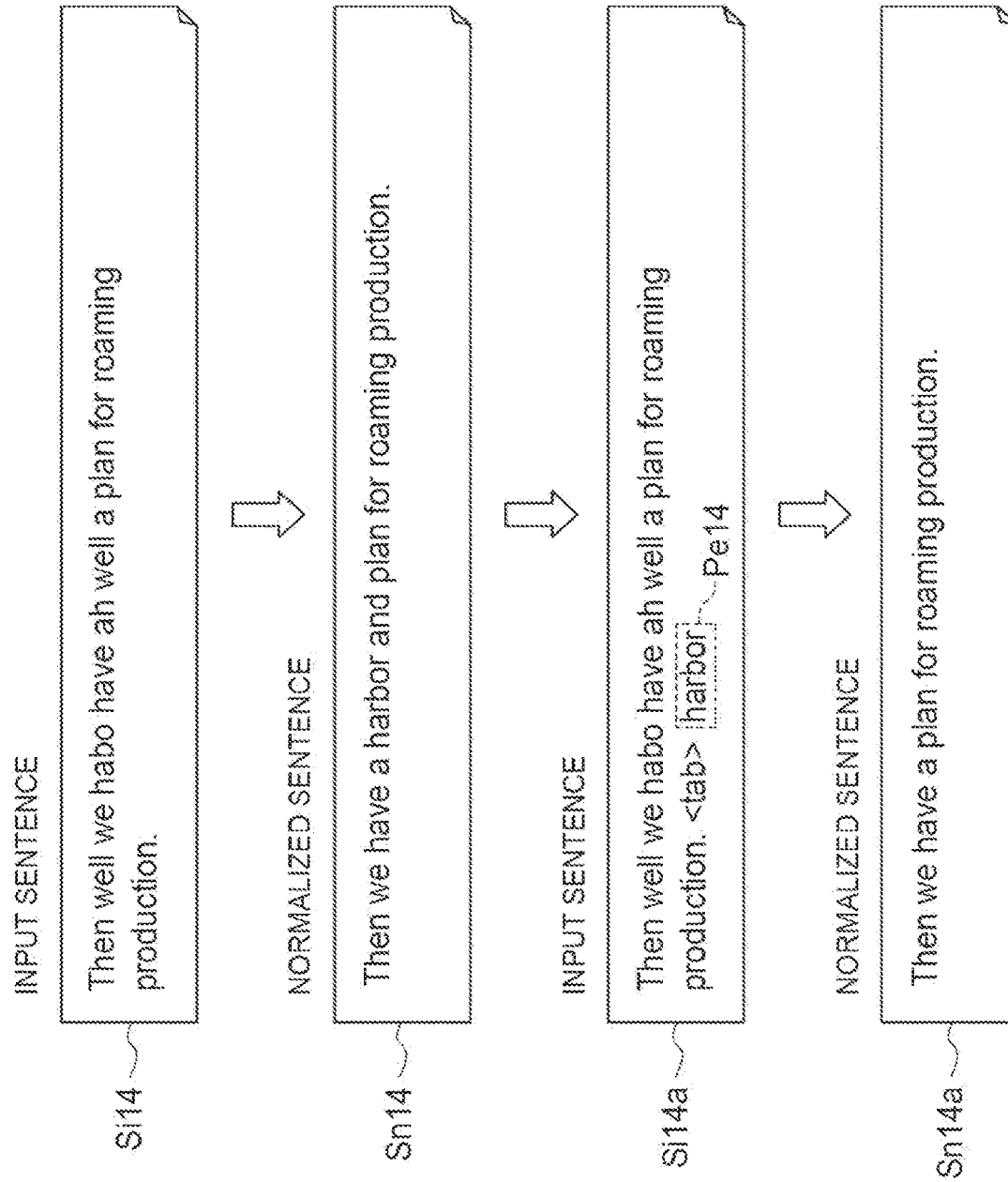
FIG. 13 is a diagram showing another example of the normalization process performed by the generation device shown in FIG. 6.

An example using English sentences will be described with reference to FIGS. 11 to 13. FIG. 11 is a diagram for describing learning data. FIG. 12 is a diagram for describing an error expression detection process. FIG. 13 is a diagram showing another example of the normalization process performed by the generation device shown in FIG. 6. FIGS. 11 to 13 correspond to FIGS. 7, 8, and 10, respectively.

In the example shown in FIG. 11, the normalized parallel translation corpus storage unit 18 stores a normalized parallel translation data in which an English tagged original sentence Stag11 for learning is associated with an English normalized sentence Sln11 for learning, and a normalized parallel translation data in which an English tagged original sentence Stag12 for learning is associated with an English normalized sentence Sln12 for learning. The tagged original sentence Stag11 for learning includes an original sentence So11 including some noises and an exclusion expression Pe11. Similarly, the tagged learning original sentence Stag12 includes an original sentence So12 including some noises and an exclusion expression Pe12. The normalized sentence Sln11 for learning is a sentence not including the exclusion expression Pe11 designated in the tagged original sentence Stag11 for learning, and is a sentence obtained by removing the noises from the original sentence So11. The normalized sentence Sln12 for learning is a sentence not including the exclusion expression Pe12 designated in the tagged original sentence Stag12 for learning, and is a sentence obtained by removing the noises from the original sentence So12.

The normalized parallel translation corpus storage unit 75 stores a normalized parallel translation data in which an English original sentence Slo13 for learning is associated with an English normalized sentence Sln13 for learning. The original sentence Slo13 for learning includes some noises. The normalized sentence Sln13 for learning is a sentence obtained by removing the noises from the original sentence Slo13 for learning.

When the normalization model 23 receives an English input sentence Si12 for which no exclusion expression is designated, the normalization model 23 outputs an English normalized sentence Sn12. The normalized sentence Sn12 is a sentence obtained by removing noises from the input sentence Si12. When the normalization model 23 receives an English input sentence Si13 in which an exclusion expression Pe13 is designated, the normalization model 23 outputs an English normalized sentence Sn13 not including the exclusion expression Pe13. The normalized sentence Sn13 is a sentence not including the exclusion expression Pe 13 designated in the input sentence Si13, and is a sentence obtained by removing noises from the input sentence Si13. If the exclusion expression Pe13 is not designated in the input sentence Si13, the normalization model 23 may output an English normalized sentence Sn13a including the exclusion expression Pe 13.

In the example shown in FIG. 12, the normalized sentence Sn 14 is output from the normalization model 23. The likelihood of a word W11 is 0.2, and the likelihood of each of words W12 to W16 is 0.8. The threshold value is set to, for example, 0.7 or more. The detection unit 24 compares the likelihood of each word with the threshold value to detect the word W11 having a likelihood smaller than the threshold value. The detection unit 24 detects a noun phrase (in the example of FIG. 12, the word W1) including the word W11 as an error expression E11, designates the error expression E11 as an exclusion expression in an input sentence, and outputs the input sentence in which the exclusion expression is designated to the normalization model 23.

In the example shown in FIG. 13, the English normalized sentence Sn14 is generated by normalizing an English input sentence Si14. Since the likelihood of the word W11 among the words constituting the normalized sentence Sn14 is smaller than the threshold value (see FIG. 12), the noun phrase (word W11) including the word W11 is detected as the error expression E11. An English input sentence Si14a is generated by adding the error expression E11 to the input sentence Si14 as the exclusion expression Pe14. The input sentence Si14a is output to the normalization model 23. The input sentence Si14a is a sentence obtained by adding <tab> and the error expression E11 as character strings to the end of the input sentence Si14. That is, in the input sentence Si14a, the error expression E11 is designated as the exclusion expression Pe14. Then, an English normalized sentence Sn14a is generated by normalizing the input sentence Si14a so as not to include the error expression E11. Since the likelihoods of all words constituting the normalized sentence Sn14a are greater than the threshold value, the normalized sentence Sn14a is output to the translation unit 14.

As described above, the same effect as that of the generation device 10 is achieved in the generation device 10A. In the generation device 10A, the normalization unit 12A includes the normalization model 23, which is a machine translation model generated by executing machine learning using learning data generated using the second parallel translation corpus. The normalization model 23 receives an input sentence and outputs a normalized sentence. According to this configuration, the number of machine translation models used for generating a normalized sentence from an input sentence can be reduced by half (up to one) as compared with the generation device 10. Therefore, the time required for the normalization process can be shortened, and the speed of the normalization process can be improved. In the generation device 10A, the scale of the hardware can be reduced as compared with the generation device 10, so that the cost can be reduced.

In the generation device 10A, the generation unit 17 generates learning data for learning the normalization model 23. Specifically, the translation unit 73 translates an original sentence for learning in the first language into the third language using the second parallel translation data to generate a translated sentence for learning. The translation unit 74 translates the translated sentence for learning into the first language using the second parallel translation data to generate a normalized sentence for learning that is grammatically correct for the first language. The original sentence for learning and the normalized sentence for learning are generated as learning data. According to this configuration, the translation unit 73 and the translation unit 74 generate the normalized sentence for learning only by preparing the original sentence for learning, so that the learning data can be easily generated.

The translation unit 73 and the translation unit 74 are machine translation models generated by executing machine learning using the second parallel translation corpus. According to this configuration, the accuracy of the normalized sentence for learning can be improved by allowing the translation unit 73 and the translation unit 74 to learn using a sufficient amount of second parallel translation corpus. As a result, the accuracy of the normalization process performed by the normalization model 23 can be improved.

The detection unit 24 detects an error expression included in a normalized sentence, adds a designation of an exclusion expression based on the error expression to the input sentence, and outputs the input sentence to which the designation of the exclusion expression has been added to the normalization model 23. The normalization model 23 receives the input sentence to which the designation of the exclusion expression has been added, and outputs a normalized sentence not including the exclusion expression. This configuration makes it possible to detect an expression that cannot be normalized correctly as an error expression, and to obtain a normalized sentence that does not include the error expression. Therefore, since the accuracy of the normalization process can be improved, the influence of noise on the translated sentence can be further reduced. As a result, the translation accuracy can be further improved.

The normalization model 23 outputs the likelihood of each word constituting the normalized sentence together with the normalized sentence. The lower the likelihood of a word, the more likely it is that the word has not been correctly normalized. Therefore, the detection unit 24 detects an error expression based on the likelihood of each word. According to this configuration, for example, a phrase including a word with a low likelihood can be detected as an error expression. As a result, the detection accuracy of the error expression can be improved.

The normalization model 23 is a machine translation model for causing a computer to function so as to receive an input sentence as an input and output a normalized sentence. The normalization model 23 is generated by executing machine learning using, as learning data, a combination of an original sentence for learning and a normalized sentence for learning obtained by converting the original sentence for learning into a grammatically correct sentence in the first language. According to this configuration, the accuracy of the normalization process can be improved by learning the normalization model 23 by the learning data described above.

The normalization model 23 is generated by executing machine learning further using, as learning data, a combination of another original sentence for learning including a designation of an exclusion expression and another normalized sentence for learning obtained by converting the other original sentence for learning into a grammatically correct sentence in the first language and not including the exclusion expression. According to this configuration, upon receiving an input sentence including a designation of an exclusion expression, the normalization model 23 can output a normalized sentence not including the exclusion expression. Therefore, the accuracy of the normalization process can be further improved.

Although the embodiments of the present disclosure have been described above, the present disclosure is not limited to the above embodiments.

Each of the generation devices 10 and 10A may be configured by a single device coupled physically or logically, or may be configured by two or more devices that are physically or logically separated from each other. For example, each of the generation devices 10 and 10A may be implemented by a plurality of computers distributed over a network, such as cloud computing. As described above, the configuration of the generation devices 10 and 10A may include any configuration that can realize the functions of the generation devices 10 and 10A.

The generation device 10 may not include the parallel translation corpus storage unit 13, and may acquire the second parallel translation corpus from the outside. Similarly, the generation device 10A may not include the parallel translation corpus storage unit 72, and may acquire the second parallel translation corpus from the outside. Similarly, the generation devices 10 and 10A may not include the parallel translation corpus storage unit 15, and may acquire the first parallel translation corpus from the outside. The generation device 10A may not include the generation unit 17, and may acquire the normalized parallel translation corpus from the outside. The generation device 10A may not include the normalized parallel translation corpus storage unit 18, and may acquire another normalized parallel translation corpus from the outside.

The translation unit 21 may not be a machine translation model as long as the translation unit 21 has a feature of converting an input sentence into a translated sentence for normalization using the second parallel translation corpus. The translation unit 22 may not be a machine translation model as long as the translation unit 22 has a feature of converting a normalized translated sentence into a normalized sentence using the second parallel translation corpus. The translation unit 14 may not be a machine translation model as long as the translation unit 14 has a feature of converting a normalized sentence into a translated sentence using the first parallel translation corpus. The translation unit 73 may not be a machine translation model as long as the translation unit 73 has a feature of converting an original sentence for learning into a translated sentence for learning using the second parallel translation corpus. The translation unit 74 may not be a machine translation model as long as the translation unit 74 has a feature of converting a translated sentence for learning into a normalized sentence for learning using the second parallel translation corpus.

For example, the output unit 16 may add a combination of an input sentence and a translated sentence as parallel translation data to the first parallel translation corpus stored in the parallel translation corpus storage unit 15. In this case, the translation unit 14 may learn every time parallel translation data is added to the first parallel translation corpus, or may learn every time a predetermined time elapses. According to this configuration, the translation accuracy of the translation unit 14 can be improved.

Note that the block diagrams used in the description of the above embodiments show blocks of functional units. These functional blocks (components) are realized by any combination of at least one of hardware and software. The method for realizing each functional block is not particularly limited. That is, each functional block may be realized using a single device coupled physically or logically. Alternatively, two or more devices that are physically or logically separated from each other may be directly or indirectly are connected (e.g., wired, wireless, etc.) to each other, and each functional block may be realized using these devices. The functional blocks may be realized by combining the one device or the plurality of devices mentioned above with software.

Functions include judging, deciding, determining, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating, mapping, assigning, and the like. However, the functions are not limited thereto. For example, a functional block (component) that causes transmitting is called a transmitting unit or a transmitter. For any of the above, as explained above, the realization method is not particularly limited to any one method.

Figure 14:
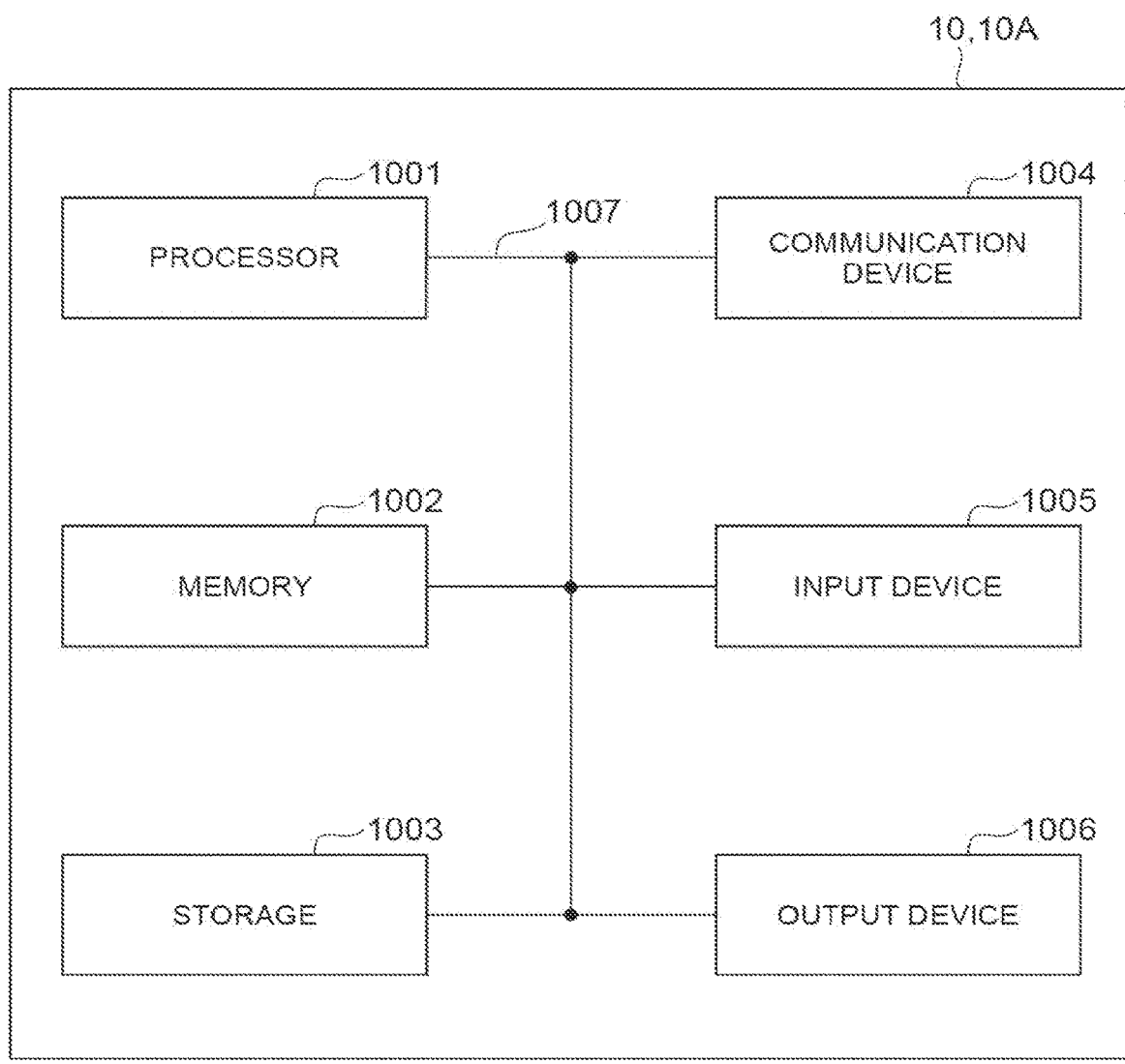
FIG. 14 is a diagram showing a hardware configuration of the generation device shown in FIG. 1.

For example, each of the generation devices 10 and 10A according to one embodiment of the present disclosure may function as a computer performing the processes of the present disclosure. FIG. 14 is a diagram showing an example of the hardware configuration of the generation devices 10 and 10A according to the embodiment of the present disclosure. The above-described generation devices 10 and 10A may be physically configured as a computer device including a processor 1001, a memory 1002, a storage 1003, a communication device 1004, an input device 1005, an output device 1006, a bus 1007, and the like.

In the following description, the term "device" can be replaced with a circuit, a device, a unit, etc. The hardware configuration of each of the generation devices 10 and 10A may be configured to include one or more of the devices shown in the figure, or may be configured not to include some of the devices.

Each function of the generation devices 10 and 10A is realized by causing the processor 1001, by loading predetermined software (program) onto hardware such as the processor 1001 and the memory 1002, to perform computation to control the communication via the communication device 1004 and to control at least one of reading data from and writing data to the memory 1002 and the storage 1003.

The processor 1001 operates, for example, an operating system to control the entire computer. The processor 1001 may be configured by a central processing unit (CPU) including an interface with a peripheral device, a controller, an arithmetic unit, a register, and the like. For example, each function of the above-described generation devices 10 and 10A may be realized by the processor 1001.

The processor 1001 reads a program (program code), a software module, data, and the like from at least one of the storage 1003 and the communication device 1004 into the memory 1002, and executes various processes in accordance with these. As the program, a program for causing a computer to execute at least a part of the operations described in the above-described embodiments is used. For example, each function of the generation devices 10 and 10A may be realized by a control program stored in the memory 1002 and operating in the processor 1001. Although it has been described that the various processes described above are executed by a single processor 1001, the various processes may be executed simultaneously or sequentially by two or more processors 1001. The processor 1001 may be implemented by one or more chips. The program may be transmitted from a network via a telecommunication line.

The memory 1002 is a computer-readable recording medium, and, for example, may be configured by at least one of a read only memory (ROM), an erasable programmable ROM (EPROM), an electrically erasable programmable ROM (EEPROM), a random access memory (RAM) and the like. The memory 1002 may be referred to as register, cache, main memory (main storage) or the like. The memory 1002 can store executable programs (program codes), software modules, and the like for performing the generation method according to the embodiment of the present disclosure.

The storage 1003 is a computer-readable recording medium, and, for example, may be configured by at least one of an optical disk such as a compact disc ROM (CD-ROM), a hard disk drive, a flexible disk, a magneto-optical disk (e.g., a compact disk, a digital versatile disk, a Blu-ray (Registered Trademark) disk), a smart card, a flash memory (e.g., a card, a stick, a key drive), a floppy disk (Registered Trademark), a magnetic strip, and the like. The storage 1003 may be referred to as auxiliary storage. The storage medium described above may be, for example, a database, a server, or any other suitable medium that includes at least one of memory 1002 and storage 1003.

The communication device 1004 is hardware (transmission/reception device) for performing communication between computers through at least one of a wired network and a wireless network, and is also referred to as a network device, a network controller, a network card, a communication module, or the like. The communication device 1004 may include, for example, a high-frequency switch, a duplexer, a filter, a frequency synthesizer, and the like to realize at least one of frequency division duplex (FDD) and time division duplex (TDD). For example, the acquisition unit 11, the output unit 16, and the like described above may be realized by the communication device 1004.

The input device 1005 is an input device (e.g., a keyboard, a mouse, a microphone, a switch, a button, a sensor, or the like) that accepts input from the outside. The output device 1006 is an output device (e.g., display, speaker, LED lamp, etc.) that performs an output to the outside. The input device 1005 and the output device 1006 may be integrated (e.g., a touch panel).

Devices such as the processor 1001 and the memory 1002 are connected to each other with the bus 1007 for communicating information. The bus 1007 may be configured using a single bus or using a separate bus for every two devices.

The generation devices 10 and 10A may include hardware such as a microprocessor, a digital signal processor (DSP), an application specific integrated circuit (ASIC), a programmable logic device (PLD), a field programmable gate array (FPGA). Some or all of each functional block may be realized by the hardware. For example, processor 1001 may be implemented using at least one of such hardware components.

Notification of information is not limited to the aspects/embodiments described in the present disclosure, and may be performed using other methods.

In the processing procedures, sequences, flowcharts, and the like of each of the aspects/embodiments described in the present disclosure, the order of processing may be interchanged, as long as there is no inconsistency. For example, the various steps of the methods described in the present disclosure are presented using exemplary order and are not limited to the particular order presented.

Information and the like may be output from an upper layer (or lower layer) to a lower layer (or upper layer). Information and the like may be input and output via a plurality of network nodes.

The input/output information and the like may be stored in a specific location (e.g., a memory) or may be managed using a management table. The information to be input/output and the like can be overwritten, updated, or added. The output information and the like may be deleted. The input information or the like may be transmitted to another device.

The determination may be performed by a value (0 or 1) represented by one bit, a truth value (Boolean: true or false), or a comparison of a numerical value (for example, a comparison with a predetermined value).

The aspects/embodiments described in the present disclosure may be used separately, in combination, or switched with the execution of each aspect/embodiment. The notification of the predetermined information (for example, notification of "being X") is not limited to being performed explicitly, and may be performed implicitly (for example, without notifying the predetermined information).

Although the present disclosure has been described in detail above, it is apparent to those skilled in the art that the present disclosure is not limited to the embodiments described in the present disclosure. The present disclosure may be implemented as modifications and variations without departing from the spirit and scope of the present disclosure as defined by the claims. Accordingly, the description of the present disclosure is for the purpose of illustration and has no restrictive meaning relative to the present disclosure.

Software, whether referred to as software, firmware, middleware, microcode, hardware description language, or other names, should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function, etc.

Software, an instruction, information, and the like may be transmitted and received via a transmission medium. For example, if software is transmitted from a website, a server, or any other remote source using at least one of wired technologies (such as a coaxial cable, an optical fiber cable, a twisted pair, and a digital subscriber line (DSL)) and wireless technologies (such as infrared light and microwaves), at least one of these wired and wireless technologies is included within the definition of a transmission medium.

The information, signals, and the like described in the present disclosure may be represented using any of a variety of different technologies. For example, data, instructions, commands, information, signals, bits, symbols, chips, etc., which may be referred to throughout the above description, may be represented by voltages, currents, electromagnetic waves, magnetic fields or particles, optical fields or photons, or any combination thereof.

It should be noted that terms described in the present disclosure and terms necessary for understanding the present disclosure may be replaced with terms having the same or similar meanings.

The terms "system" and "network" as used in the present disclosure are used interchangeably.

The information, parameters, and the like described in the present disclosure may be expressed using absolute values, relative values from a predetermined value, or other corresponding information.

The names used for the parameters described above are in no way restrictive. Further, the mathematical expressions and the like using these parameters may be different from the contents explicitly disclosed in the present disclosure.

The term "determining" as used in the present disclosure may encompass a wide variety of operations. The "determining" may include, for example, judging, calculating, computing, processing, deriving, investigating, looking up, search, inquiry (e.g., searching in a table, a database, or another data structure), and ascertaining The "determining" may include receiving (e.g., receiving information), transmitting (e.g., transmitting information), input, output, and accessing (e.g., accessing data in a memory). The "determining" may include resolving, selecting, choosing, establishing, and comparing. That is, the "determining" may include some operations that may be considered as the "determining". The "determining" may be read as "assuming", "expecting", "considering", etc.

The term "connected", "coupled", or any variation thereof means any direct or indirect connection or coupling between two or more elements. One or more intermediate elements may be present between two elements that are "connected" or "coupled" to each other. The coupling or connection between the elements may be physical, logical, or a combination thereof. For example, "connection" may be read as "access". When "connect" or "coupling" is used in the present disclosure, the two elements to be connected or coupled can be considered to be "connected" or "coupled" to each other using one or more electrical wires, cables, printed electrical connections, and as some non-limiting and non-exhaustive example, electromagnetic energy having wavelengths in the radio frequency region, the microwave region, and light (both visible and invisible) regions.

The term "based on" as used in the present disclosure does not mean "based only on" unless otherwise specified. In other words, the term "based on" means both "based only on" and "based at least on".

Any reference to an element using the designations "first", "second", etc., as used in the present disclosure does not generally limit the amount or order of the element. Such designations may be used in the present disclosure as a convenient way to distinguish between two or more elements. Thus, references to the first and second elements do not imply that only two elements may be adopted, or that the first element must precede the second element in any way.

The "unit" in the configuration of each of the above devices may be replaced with "circuit", "device", etc.

When "include", "including", and variations thereof are used in the present disclosure, these terms are intended to be inclusive, as well as the term "comprising". Furthermore, the term "or" as used in the present disclosure is intended not to be an exclusive OR.

In the present disclosure, where article such as "a", "an" and "the" in English is added by translation, the present disclosure may include that the noun following the article is plural.

In the present disclosure, the term "A and B are different" may mean that "A and B are different from each other". The term may mean that "each of A and B is different from C". Terms such as "separated" and "combined" may also be interpreted in a similar manner to "different".

REFERENCE SIGNS LIST 10, 10A Generation device
11 Acquisition unit
12, 12A Normalization unit
14 Translation unit (first translation unit)
16 Output unit
17 Generation unit
21 Translation unit (second translation unit)
22 Translation unit (third translation unit)
23 Normalization model
24 Detection unit
73 Translation unit (second translation unit)
74 Translation unit (third translation unit)

The invention claimed is:

1. A generation device that generates a translated sentence in a second language different from a first language from an input sentence in the first language to be translated, the generation device comprising:
processing circuitry configured to implement
an acquisition unit configured to acquire the input sentence obtained by converting a result of voice recognition of voices issued by a user into a text;
a normalization unit including a normalization model configured to receive the input sentence and to output a normalized sentence that is a grammatically correct sentence in the first language;
a first translation unit configured to generate the translated sentence by translating the normalized sentence into the second language using first parallel translation data that is parallel translation data between the first language and the second language; and
a generation unit configured to generate learning data, wherein the generation unit includes:
a second translation unit configured to generate a translated sentence for learning by translating an original sentence for learning in the first language into a third language, which is different from the first language and the second language, using second parallel translation data that is parallel translation data between the third language and the first language; and
a third translation unit configured to generate a normalized sentence for learning that is a grammatically correct sentence in the first language by translating the translated sentence for learning into the first language using the second parallel translation data, and configured to output a combination of the normalized sentence for learning and the original sentence for learning as the learning data,
wherein the normalization model is a machine-translation model generated by executing machine-learning using the learning data, and
wherein a data amount of the second parallel translation data is larger than a data amount of the first parallel translation data.

2. The generation device according to claim 1, wherein each of the second translation unit and the third translation unit is a machine-translation model generated by executing machine-learning using the second parallel translation data.

3. The generation device according to claim 1, wherein the normalization unit further includes a detection unit configured to detect an error expression included in the normalized sentence,
wherein the detection unit adds designation of an exclusion expression based on the error expression to the input sentence and outputs the input sentence to which the designation of the exclusion expression is added to the normalization model, and
wherein the normalization model receives the input sentence to which the designation of the exclusion expression is added and outputs the normalized sentence not including the exclusion expression.

4. The generation device according to claim 2, wherein the normalization unit further includes a detection unit configured to detect an error expression included in the normalized sentence,
wherein the detection unit adds designation of an exclusion expression based on the error expression to the input sentence and outputs the input sentence to which the designation of the exclusion expression is added to the normalization model, and
wherein the normalization model receives the input sentence to which the designation of the exclusion expression is added and outputs the normalized sentence not including the exclusion expression.

5. The generation device according to claim 3, wherein the normalization model outputs a likelihood of each word constituting the normalized sentence together with the normalized sentence, and
wherein the detection unit detects the error expression based on the likelihood of each word.

6. The generation device according to claim 4, wherein the normalization model outputs a likelihood of each word constituting the normalized sentence together with the normalized sentence, and
wherein the detection unit detects the error expression based on the likelihood of each word.

* * * * *